United States Patent
Kim et al.

(10) Patent No.: US 10,338,788 B2
(45) Date of Patent: Jul. 2, 2019

(54) APPARATUS AND METHOD FOR PROCESSING CONTENTS IN PORTABLE TERMINAL

(71) Applicant: Samsung Electronics Co., Ltd., Gyeonggi-do (KR)

(72) Inventors: Jihyun Kim, Gyeonggi-do (KR); Youngeun Han, Gyeonggi-do (KR); Kwangtai Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 872 days.

(21) Appl. No.: 14/328,642

(22) Filed: Jul. 10, 2014

(65) Prior Publication Data

US 2015/0019997 A1    Jan. 15, 2015

(30) Foreign Application Priority Data

Jul. 10, 2013    (KR) ........................ 10-2013-0080670

(51) Int. Cl.
*G06F 3/0484*    (2013.01)
*H04L 12/58*    (2006.01)
(Continued)

(52) U.S. Cl.
CPC ........ *G06F 3/04842* (2013.01); *G06F 3/0482* (2013.01); *G06F 3/0486* (2013.01);
(Continued)

(58) Field of Classification Search
CPC ........... G06F 3/04817; G06F 17/30994; G06F 3/0482; G06F 17/30997;
(Continued)

(56) References Cited

U.S. PATENT DOCUMENTS 8,321,802 B2    11/2012    Rogers
2005/0249346 A1    11/2005    Schnurr
(Continued)

FOREIGN PATENT DOCUMENTS

EP    2458489 A2    5/2012
EP    2458489 A3    8/2012

OTHER PUBLICATIONS

Extended European Search Report dated Nov. 25, 2014 in connection with European Patent Application No. 14176337,5; 6 pages.
(Continued)

*Primary Examiner* — Renee D Chavez
*Assistant Examiner* — Ayesha E Huertas Torres

(57) ABSTRACT

Provided are a method and an apparatus for processing contents in a portable terminal. The method includes displaying the contents on a contents screen. The method also includes displaying a tray to display selected information in the contents screen when the information is selected from the contents screen. The method also includes displaying information and a recommendation application related with the information on the tray when the selected text is moved to the tray. A user selects and collects collected texts in the tray without inconveniently pasting the collected texts into a corresponding field to recommend an application related with the collected texts, and executes a selected application when selection of the application is detected, and collectively maps the executed application to a corresponding item.

20 Claims, 20 Drawing Sheets

(51) Int. Cl.
*H04M 1/725* (2006.01)
*G06F 3/0482* (2013.01)
*G06F 3/0486* (2013.01)
*G06F 3/0488* (2013.01)

(52) U.S. Cl.
CPC ........ *G06F 3/0488* (2013.01); *G06F 3/04886* (2013.01); *H04L 51/22* (2013.01); *H04M 1/72522* (2013.01); *G06F 2203/04803* (2013.01)

(58) Field of Classification Search
CPC ....... G06F 2203/04803; G06F 3/04886; G06F 17/50; G06F 2217/04; G06Q 30/0257; G06Q 30/0269; H04N 1/00416; H04N 21/4314; G06T 19/20; G06T 2219/024
See application file for complete search history.

(56) References Cited

U.S. PATENT DOCUMENTS

| | | | |
|---|---|---|---|
| 2007/0233695 A1* | 10/2007 | Boudreau | G01C 21/20 |
| 2010/0122194 A1* | 5/2010 | Rogers | G06F 3/04817 |
| | | | 715/769 |
| 2010/0248788 A1* | 9/2010 | Yook | G06F 3/0481 |
| | | | 455/566 |
| 2011/0066976 A1 | 3/2011 | Hwang | |
| 2011/0279388 A1* | 11/2011 | Jung | G06F 3/04883 |
| | | | 345/173 |
| 2012/0287059 A1 | 11/2012 | Bamford et al. | |

OTHER PUBLICATIONS

Office Action dated Jul. 18, 2018 in connection with European Patent Application No. 14 176 337.5.

* cited by examiner

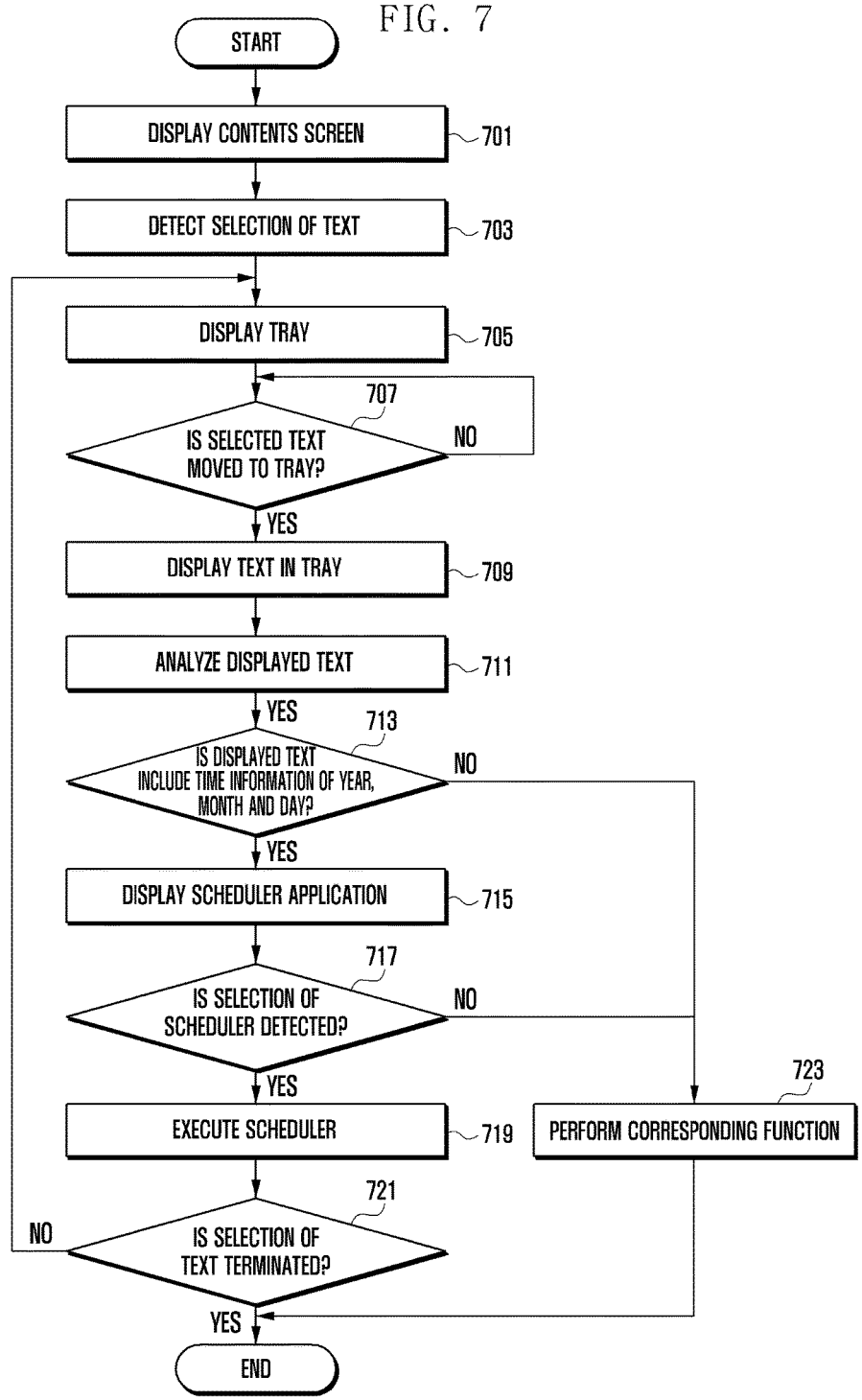

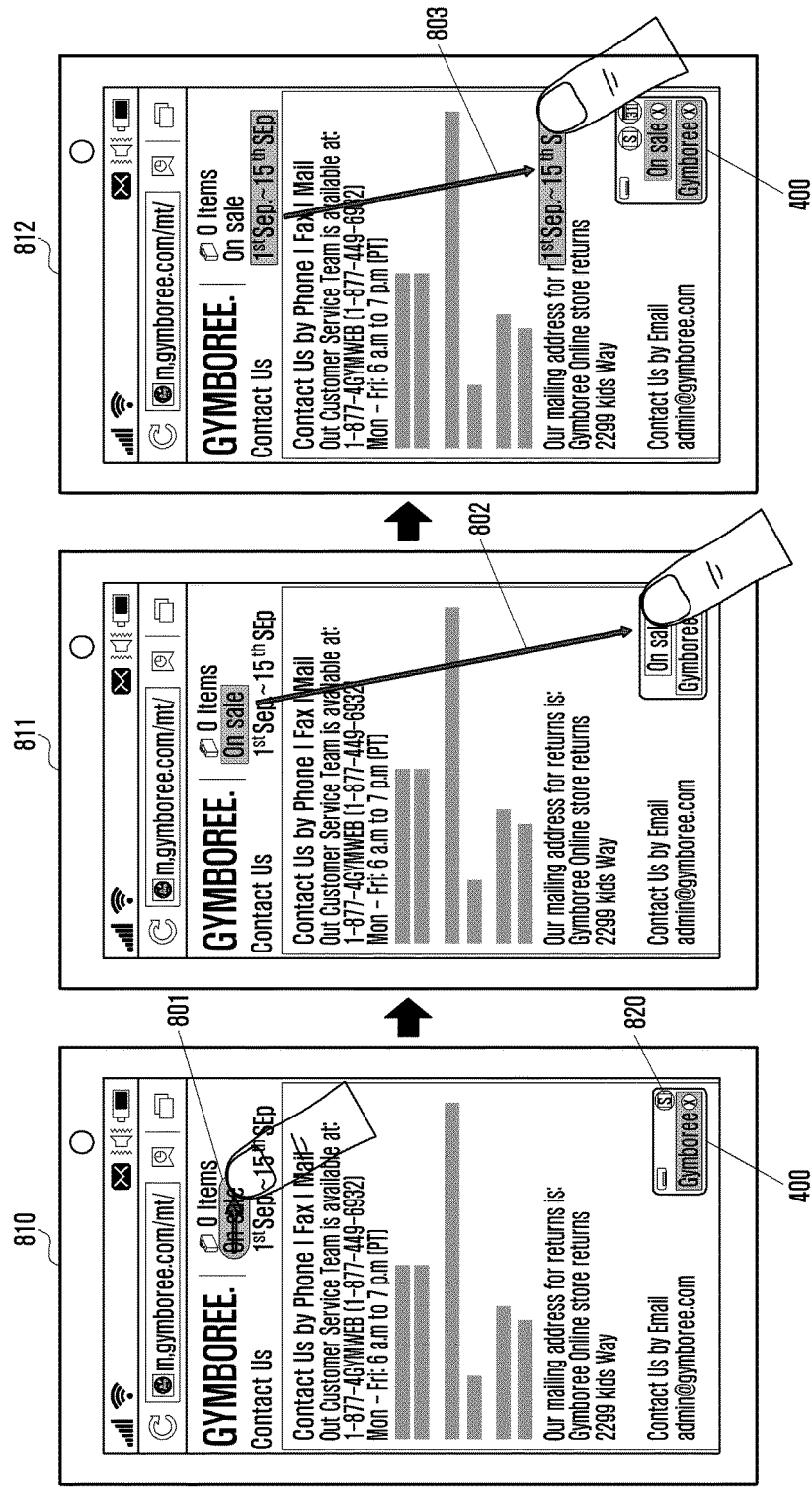

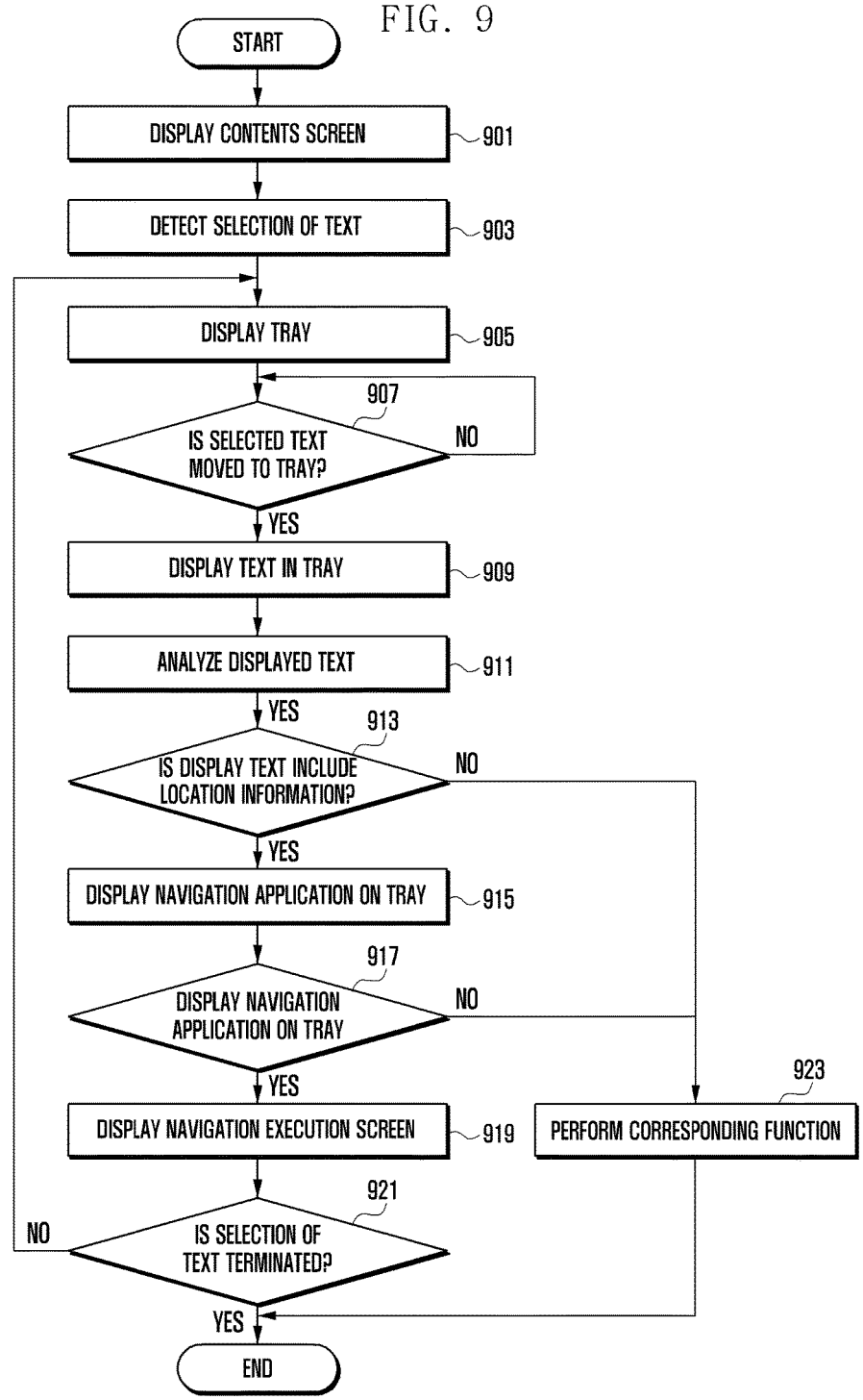

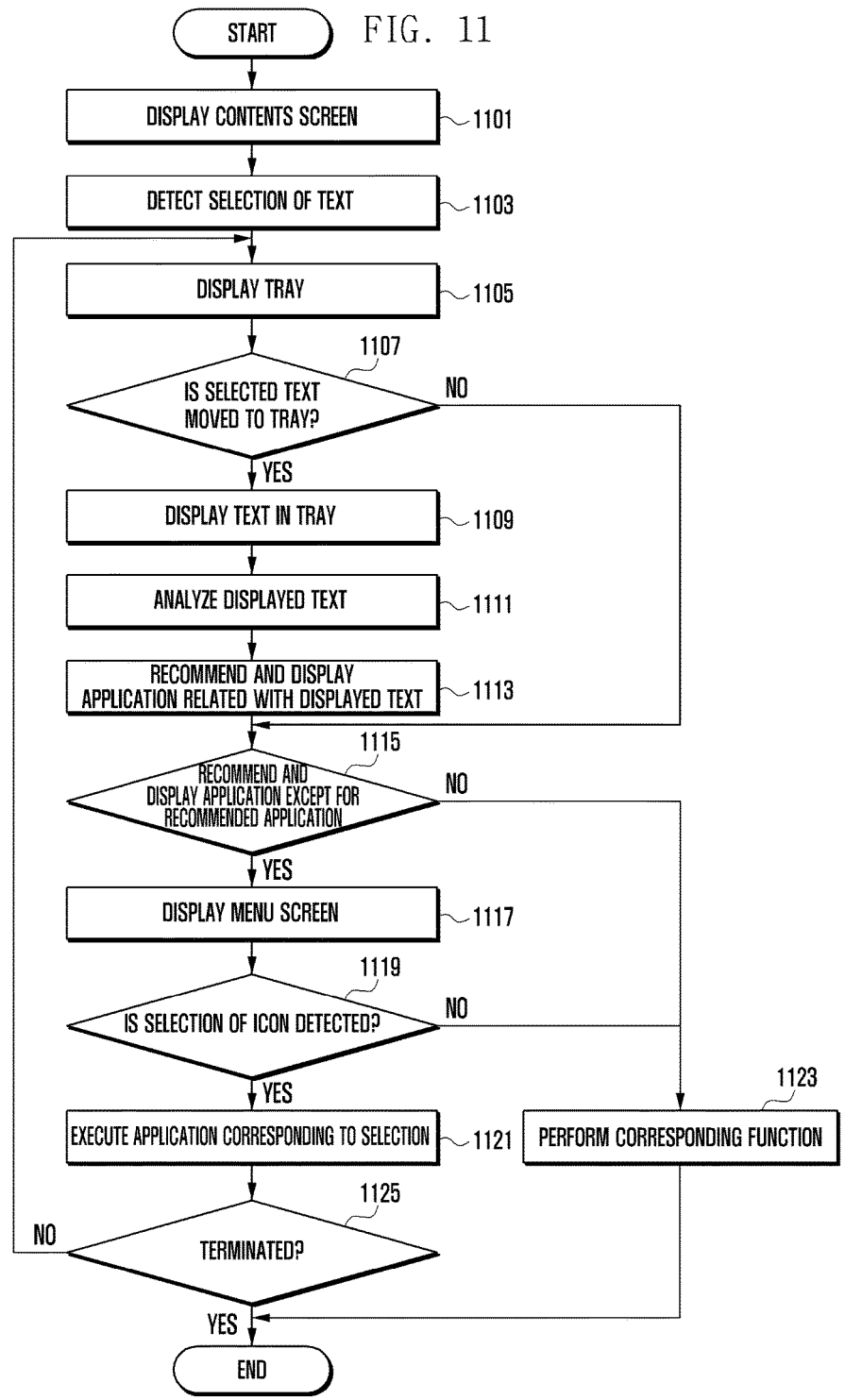

APPARATUS AND METHOD FOR PROCESSING CONTENTS IN PORTABLE TERMINAL

CROSS-REFERENCE TO RELATED APPLICATION(S) AND CLAIM OF PRIORITY

The present application is related to and claims the benefit under 35 U.S.C. § 119(a) of a Korean patent application filed on Jul. 10, 2013 in the Korean Intellectual Property Office and assigned Serial No. 10-2013-0080670, the entire disclosure of which is hereby incorporated by reference.

TECHNICAL FIELD

The present disclosure relates to an apparatus and a method for processing contents in a portable terminal, and more particularly, to an apparatus capable of processing an application corresponding to the contents by analyzing a function corresponding to information selected from the contents and a method thereof.

BACKGROUND

In recent years, with the development of digital technology, a portable terminal equipped with a touch device has various functions. For example, the portable terminal may execute various applications such as a camera, an e-mail, Internet, a video play, an electronic note, a messenger, a photograph, a game, and a video call.

In this embodiment, a contents screen displayed by execution of the application may include a text and a user may execute a corresponding application by selecting the displayed text. However, the foregoing method may execute an application corresponding to an individual word (text). For example, when the user selects a number recognized as a phone number from the contents, the portable terminal may execute a call application.

Further, when the user selects a plurality of texts (words) from the contents, the portable terminal stores the selected texts in a temporary storage area. When the application is executed, the portable terminal executes an application with reference to the texts stored in the temporary storage area. However, the method of executing the application should perform selection operations (copy and/or paste) of various steps when using a plurality of words.

SUMMARY

To address the above-discussed deficiencies, it is a primary object to provide a method capable of simultaneously displaying at least one information selected from contents displayed in a portable terminal and an application executable from the selected information on a contents screen and an apparatus thereof.

The present disclosure further provides an apparatus capable of simultaneously displaying at least one text selected from contents screen and applications executable according to the selected text on a contents screen, and collectively processing text displayed when the displayed application is selected, and a method thereof.

In accordance with an aspect of the present disclosure, an embodiment provides a method for processing contents in a portable terminal. The method includes displaying the contents on a contents screen. The method also includes displaying a tray to display selected information in the contents screen when the information is selected from the contents screen. The method also includes displaying information and a recommendation application related with the information on the tray when the selected information is moved to the tray.

In accordance with another aspect of the present disclosure, an embodiment provides an apparatus for processing contents in a portable terminal includes. The apparatus includes a display panel configured to display a tray to display a selected text from a contents screen and display a recommendation application. The apparatus also includes a touch panel configured to detect selection of the text from the contents screen, and to detect selection of an application. The apparatus also includes a controller configured to analyze the text displayed in the tray, to display an recommendation application related with the text, and to collectively process at least one text displayed in the tray when the selection of the application is detected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a process of processing a scheduler application by selecting time information from a contents screen shown in FIG. 2;

FIGS. 8A and 8B illustrate diagrams showing an operation procedure of an application executed in the procedure shown in FIG. 7;

FIG. 9 illustrates a process of processing a navigation application by selecting location information from a contents screen shown in FIG. 2;

FIG. 11 illustrates a process of selecting application except for an application displayed on a tray of the contents screen shown in FIG. 2 according to an embodiment of the present disclosure;

DETAILED DESCRIPTION

FIGS. 1 through 13, discussed below, and the various embodiments used to describe the principles of the present disclosure in this patent document are by way of illustration only and should not be construed in any way to limit the scope of the disclosure.

Those skilled in the art will understand that the principles of the present disclosure may be implemented in any suitably arranged system or method. Embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

In an embodiment of the present disclosure, if a user selects contents, a tray is displayed. The tray is an area for collecting and keeping contents selected by the user. An application related with selected contents and an option icon enabling a user to select the application may be displayed on the tray. Hereinafter, the application may be displayed as an icon.

The contents according to the embodiment of the present disclosure may include a text and an image displayed on a contents screen on which the application is executed. The application may be executed by selection of the user.

Figure 1:
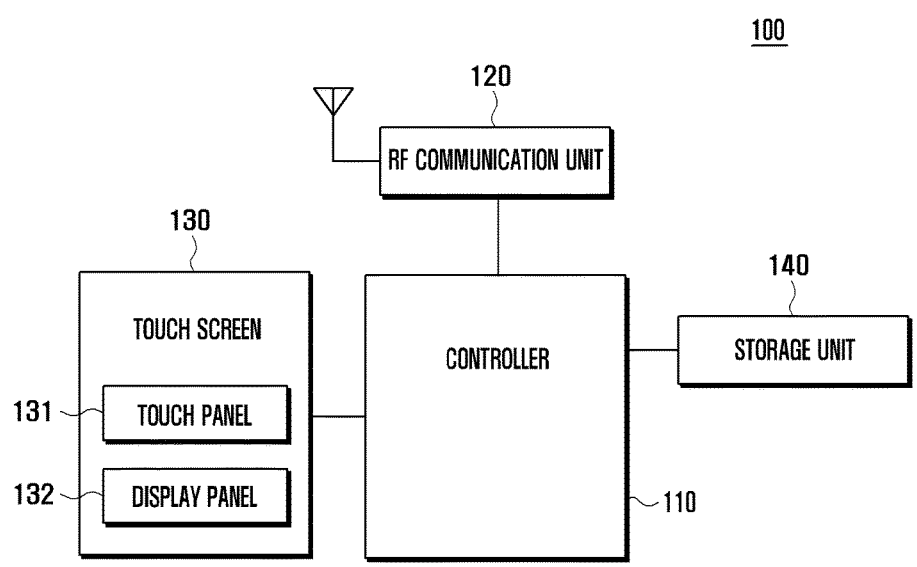
FIG. 1 illustrates a block diagram showing a configuration of a portable terminal according to an embodiment of the present disclosure.

FIG. 1 illustrates a block diagram showing a configuration of a portable terminal according to an embodiment of the present disclosure.

Referring to FIG. 1, the portable terminal 100 is configured with controller 110, a wireless communication 120, touch screen 130 and storage unit 140.

a radio frequency (RF) communication unit 120 performs a voice call, a video call, or data communication through a network under control of a controller 110. To this end, the RF communication unit 120 may include an RF transmitter for up-converting a frequency of a transmitted signal and amplifying the signal, and an RF receiver for low-noise-amplifying a received signal and down-converting a frequency of the signal. In addition, the RF communication unit 120 may include a mobile communication module (e.g., a CDMA, an LTE, a WCAMA, and the like), a digital broadcasting module (e.g., a DMB module), or a short distance communication module (e.g., a Wi-Fi module, a Bluetooth module, or a near field communication (NFC) module).

A touch screen 130 may include a touch panel 131 and a display panel 132. Further, the touch panel 131 may be integrated with the display panel 132. The display panel 132 may be configured with a Liquid Crystal Display (LCD), an Organic Light Emitted Diode (OLED), and an Active Matrix Organic Light Emitted Diode (AMOLED).

In an embodiment, the display panel 132 according to the present disclosure may display a tray capable of collecting the selected text and a recommended icon under control of the controller 110. In the present disclosure, the touch panel 131 may detect selection of contents to transfer the detected selection of the contents to the controller 110. In addition, the touch panel 131 may detect selection of an icon displayed on the tray to transfer the detected selection of the icon to the controller 110.

A storage unit 140 may include a program memory to store an operation program of the portable terminal and a data memory to store data generated during execution of a program. In the embodiment of the present disclosure, the storage unit 140 may temporarily store contents displayed in the tray before an application is executed.

The controller 110 may control an overall operation of the portable terminal 100. In various embodiments of the present disclosure, if selection of a text is detected from a displayed contents screen, the controller 110 may display the tray to be overlaid with a partial region of the contents screen. In addition, the controller 110 may analyze the selected text to determine a recommendation application related with the analyzed text, and display the selected text and the recommendation application in the tray. In this embodiment, at least one text is used. When a plurality of contents are selected, the controller 110 may analyze respective texts to determine an application related with a common characteristic of the plurality of contents, and display the texts in the tray together with the determined recommendation applications.

That is, the controller 110 may display information (hereinafter referred to as "text") selected from the contents screen by the user, and may analyze the text displayed on the tray to recommend an application related with the selected text. In this embodiment, the controller 110 may control to display a related recommendation application on the tray as an item (e.g., an icon). Further, if selection of the icon is detected, the controller 110 may control to execute an application corresponding to the detected icon. In this embodiment, the controller 110 may control to paste the text displayed on the tray into each field of the application while executing an application and.

Figure 2:
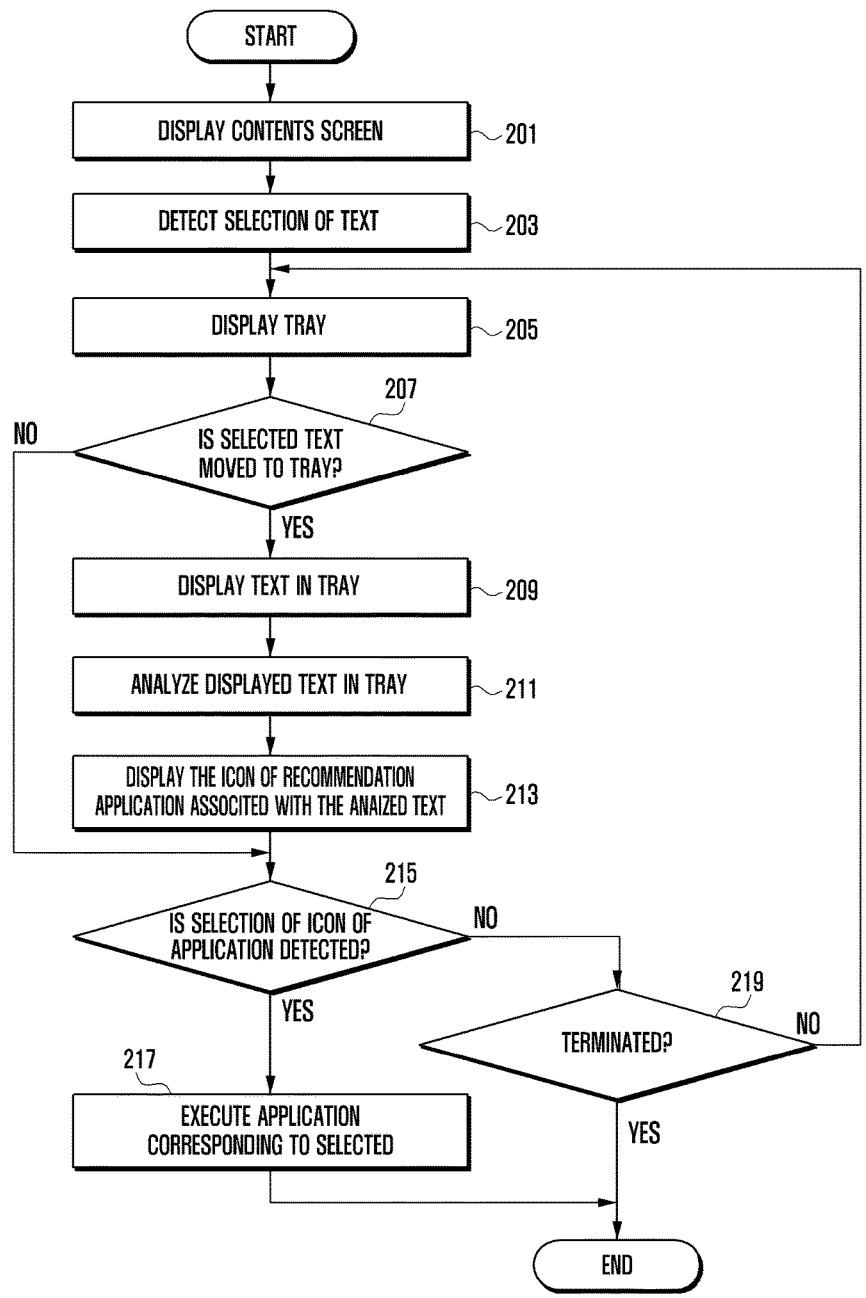
FIG. 2 illustrates a process of executing an application by using a text selected from a contents screen according to an embodiment of the present disclosure.

FIG. 2 illustrates a process of executing an application using a text selected from a contents screen according to an embodiment of the present disclosure.

Referring to FIG. 2, at operation 201, the controller 110 may display a contents screen on a display panel 132. The contents screen is a screen of an executed application, and may be an execution screen such as Internet and an electronic document. Information including texts, images, and the like may be displayed on the contents screen according to execution of the application. In various embodiments of the present disclosure, if the user selects certain information from the contents screen, the selected information may be temporarily stored, and a recommendation application related with the selected information may be simultaneously displayed with the selected information. In a following description, it is assumed that the information is a text.

Accordingly, if the user selects the text from the contents screen displayed on the display panel 132, at operation 203, the controller 110 may detect selection of the text through the touch panel 131. The selection of the text may be performed by drag operation. If the selection of the text is detected, the controller 110 may display a tray to be overlaid with a partial region of the contents screen displayed on the display panel 132 at operation 205. Next, if the user drags the selected text to move to the tray, at operation 207, the controller 110 may detect that the selected text is moved to the tray through the touch panel 131. If it is not detected that the selected text is moved to the tray, the controller 110 proceeds to operation 215, and may control to display the tray.

If it is detected that the selected text is moved to the tray, at operation 209, the controller 110 may display the selected text on the tray. At operation 211, the controller 110 may analyze the displayed text on the tray to determine a recommendation application related with the text. After that, at operation 213, the controller 110 may display the analyzed recommendation application on the tray together with the selected text. Here, the display panel 132 may display an icon corresponding to the recommendation application on the tray under control of the controller 110. In this embodiment, the user may select a plurality of texts, and the controller 110 may set and simultaneously display the respective selected texts and a recommendation application related with the respective texts on the tray.

After the selection of the text is terminated, the user may select a desired application from the tray of the display panel 132, and the controller 110 may detect the icon of the application selected by the user among at least one icon displayed on the tray at operation 215. In this embodiment, if the selection of the icon of the application is detected, at operation 217, the controller 110 may execute an application corresponding to the selected icon, and map texts displayed in the tray to each field of the executed application screen to collectively apply and/or process the mapping result. That is, when the application is executed, the controller 110 may control to fill at least one text displayed on the tray in each field of the executed application screen.

Alternatively, if the selection of the icon of the application is not detected at operation 215, the controller 110 may determine whether to additionally select the contents through the touch panel 131 at operation 219. In this embodiment, if the selection of the contents is no longer detected, the controller 110 may recognize this situation as a termination, and may control to terminate the procedure. Alternatively, if it is not recognized as the termination at operation 219, the controller controls to return to operation 203. Accordingly, the controller 110 may repeat the above procedures to additionally detect selection of the contents.

When the contents are additionally detected, the contents displayed in previous operation may be collected and displayed in the tray.

As described above, in various embodiments of the present disclosure, when the portable terminal executes the application, a text (e.g., word) may be selected from a contents screen of the executed application. Accordingly, the controller 110 may display the selected text on the tray of a partial region of the displayed contents screen, and may display recommendation application related with the selected words. Further, when the user selects the recommended application, the controller 110 may move the kept selected words to another task such that the selected words may be automatically applied to a corresponding field.

That is, the controller 110 may collect information (e.g., word configured of text) in the contents selected by the user, and display the information in the tray in a state in which the contents screen is displayed, and simultaneously display recommendation application (or task) icon closely related with the selected information. In this embodiment, the user may select information from the contents screen. If a plurality of information is selected, the controller 110 may simultaneously keep and displays the selected information and icons of a recommendation application related with the selected information on the tray. In addition, if the displayed application (or task) is selected, the controller 110 may execute a selected application, and may collectively apply and process information kept in the tray to each field of a screen of the executed application.

Figure 3:
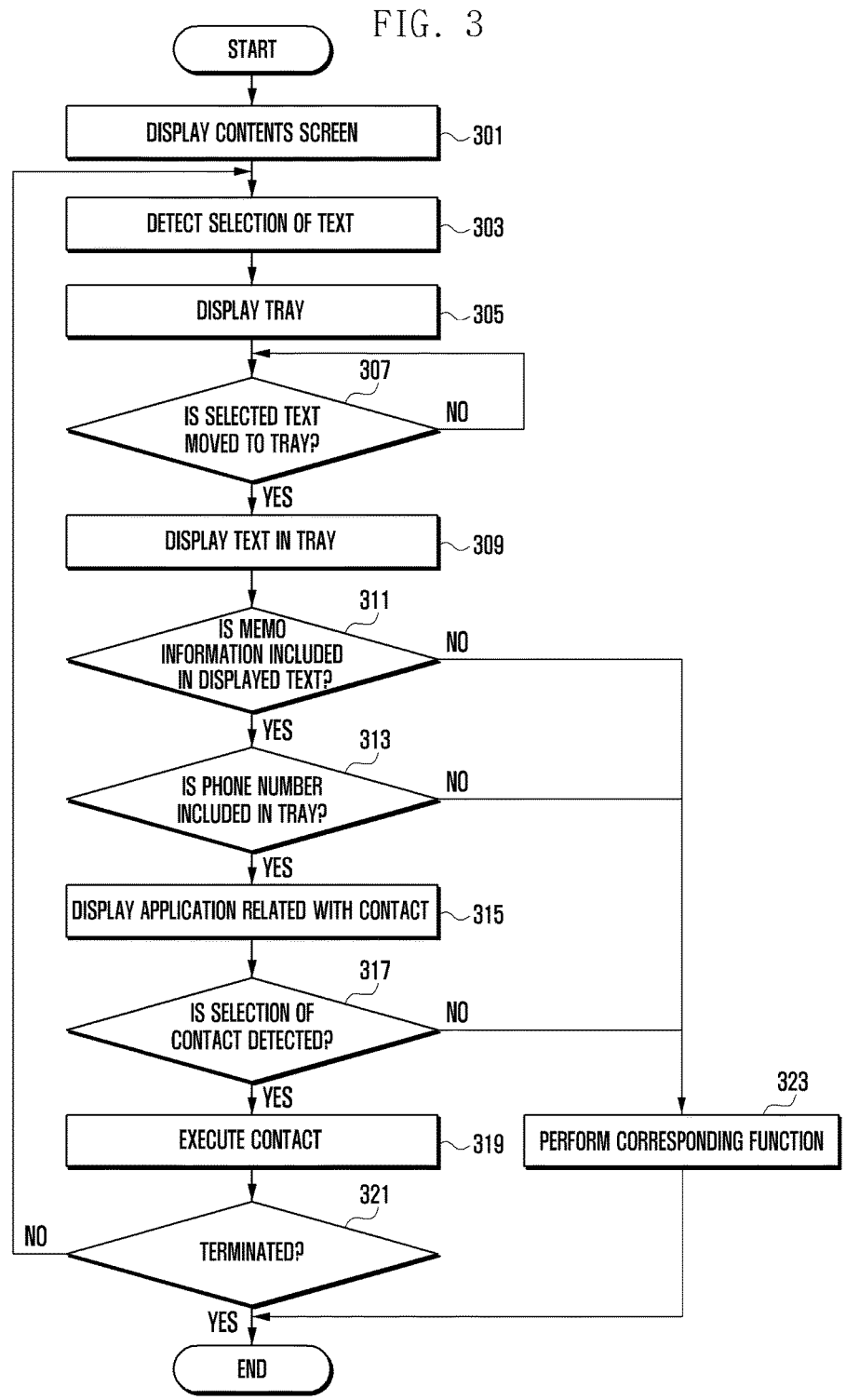
FIG. 3 illustrates a process of processing a contact application when contact information is selected from the contents screen to realize FIG. 2.

FIG. 3 illustrates a process of processing a contact application when contact information is selected from the contents screen in FIG. 2. FIGS. 4A to 4E are diagrams illustrating an operation procedure of an application executed in the method shown in FIG. 3.

Figure 4A:
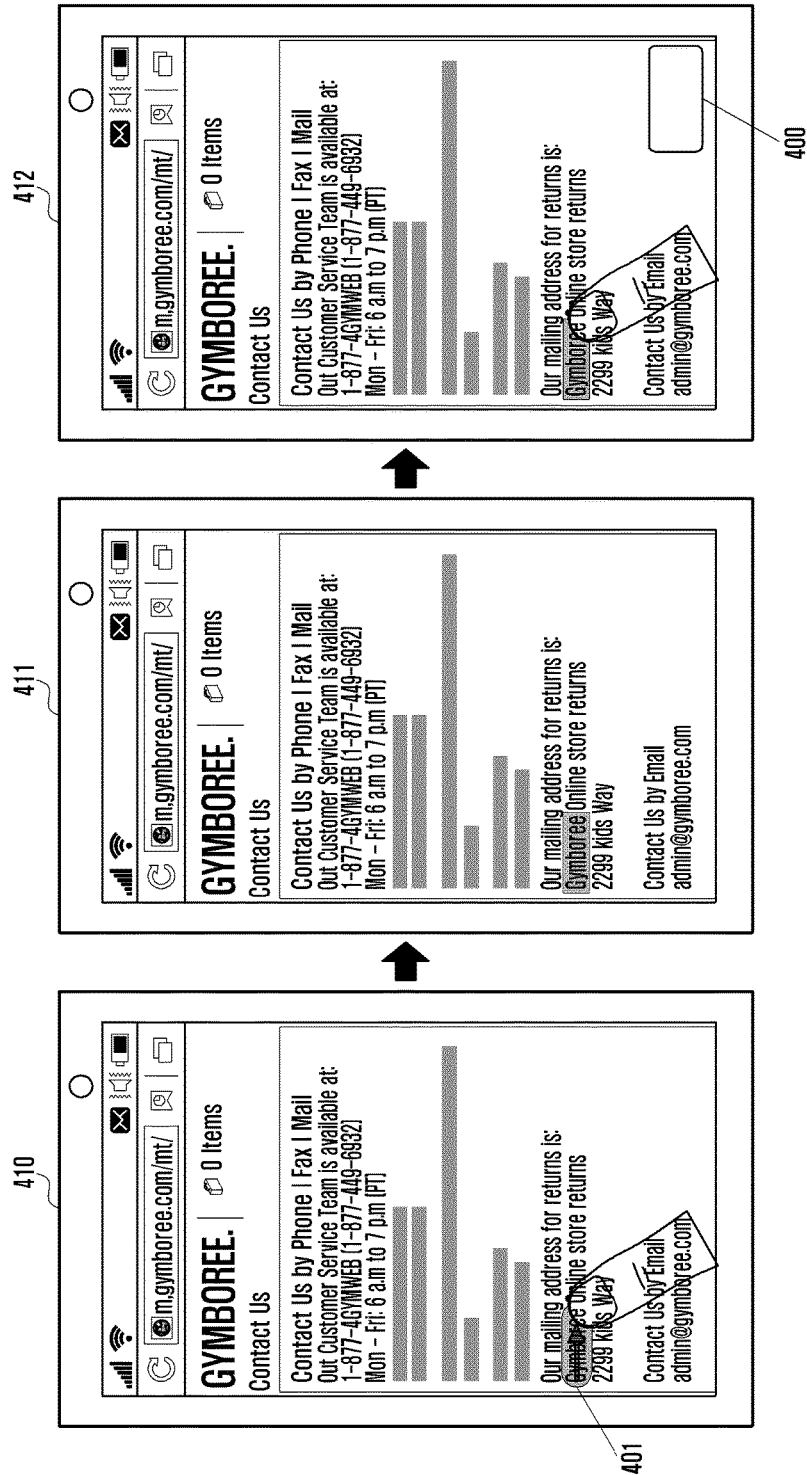
FIGS. 4A to 4E illustrate diagrams showing an operation procedure of an application executed in the method shown in FIG. 3.
Figure 4B:
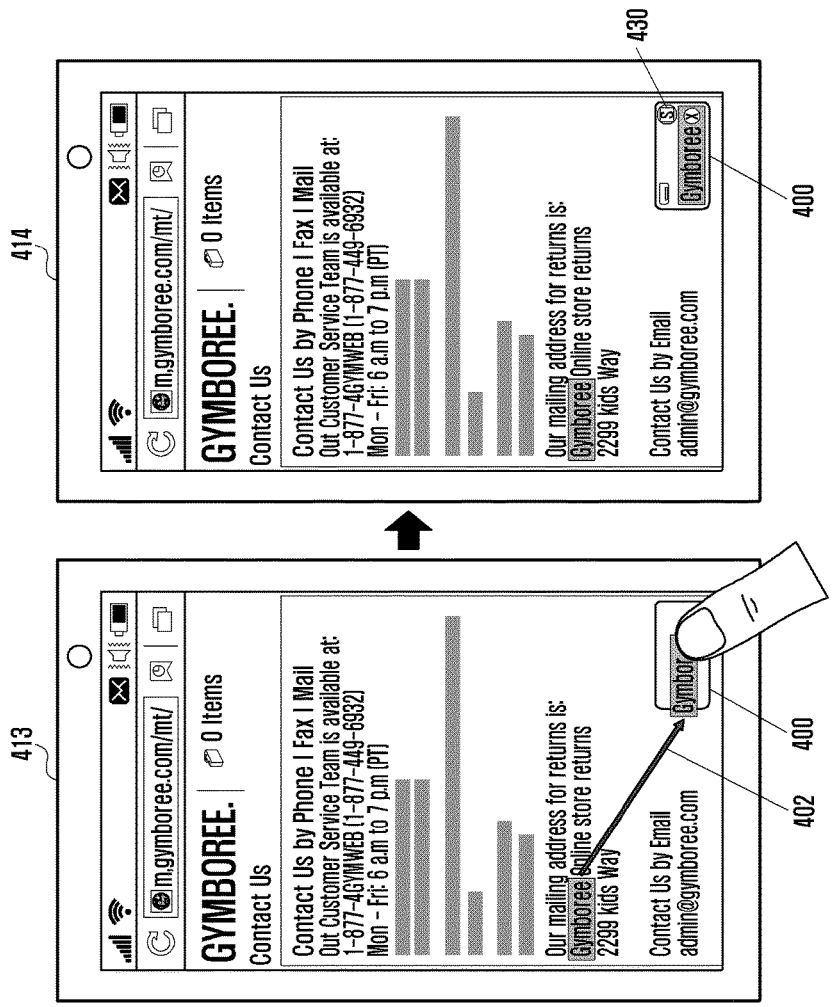

Referring to FIG. 3, and FIGS. 4A to 4E, at operation 301, the display panel 132 may display the contents screen of an executed application under control of the controller 110. It is assumed that the contents screen is an Internet execution screen, but the present disclosure is not limited thereto. In this embodiment, the contents screen displayed on the display panel 132 at operation 301 may be a screen as illustrated on a screen <410> of FIG. 4A. The user may select a text (for example, words) capable of executing a desired application from the contents screen displayed as illustrated in FIG. 4A. Further, when the user selects a desired text as illustrated in reference numeral 401 on the screen <410> of FIG. 4A, the controller 110 may shade the desired text to display the shaded text as illustrated on a screen <411> of FIG. 4A.

At operation 303, the controller 110 may detect selection of the text through the touch panel 131. As illustrated on a screen <412> of FIG. 4A, if selection of the text 'Gymboree' is detected, at operation 305, the controller 110 may display a tray 400 on a partial region of the contents screen displayed on the display panel 132. The tray 400 is a region set in order to collect, display the selected text. In this embodiment, if the user drags and moves the selected text to the tray 400 as illustrated in reference numeral 402 on a screen <413> of FIG. 4B at operation 307, the controller 110 may detect that the selected text 'Gymboree' is moved to the tray 400. That is, if a drag occurs as illustrated in reference numeral 402 on the screen <413> of FIG. 4B, the controller 110 may detect that the selected text 'Gymboree' is moved to the tray 400 through the touch panel 131. If it is detected that the text is moved to the tray 400, the controller 110 may display a text in the tray 400 as illustrated on the screen <413> of FIG. 4B. Further, the controller 110 may control to analyze the text displayed in the tray 400, display recommendation application related with the text, on a screen <414>. Here, the recommendation application may memo application 430 on a screen <414>.

Figure 4C:
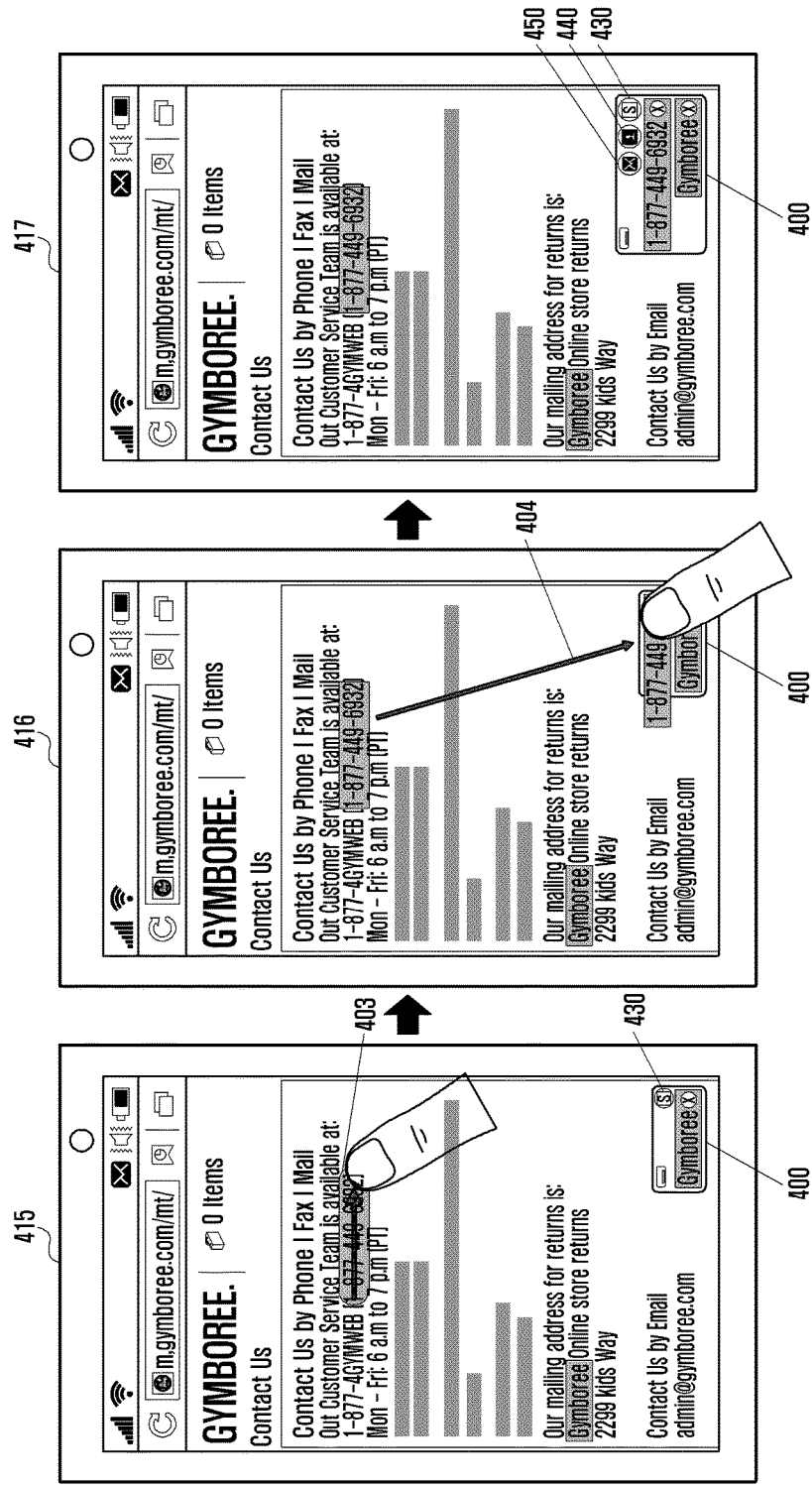
Figure 4D:
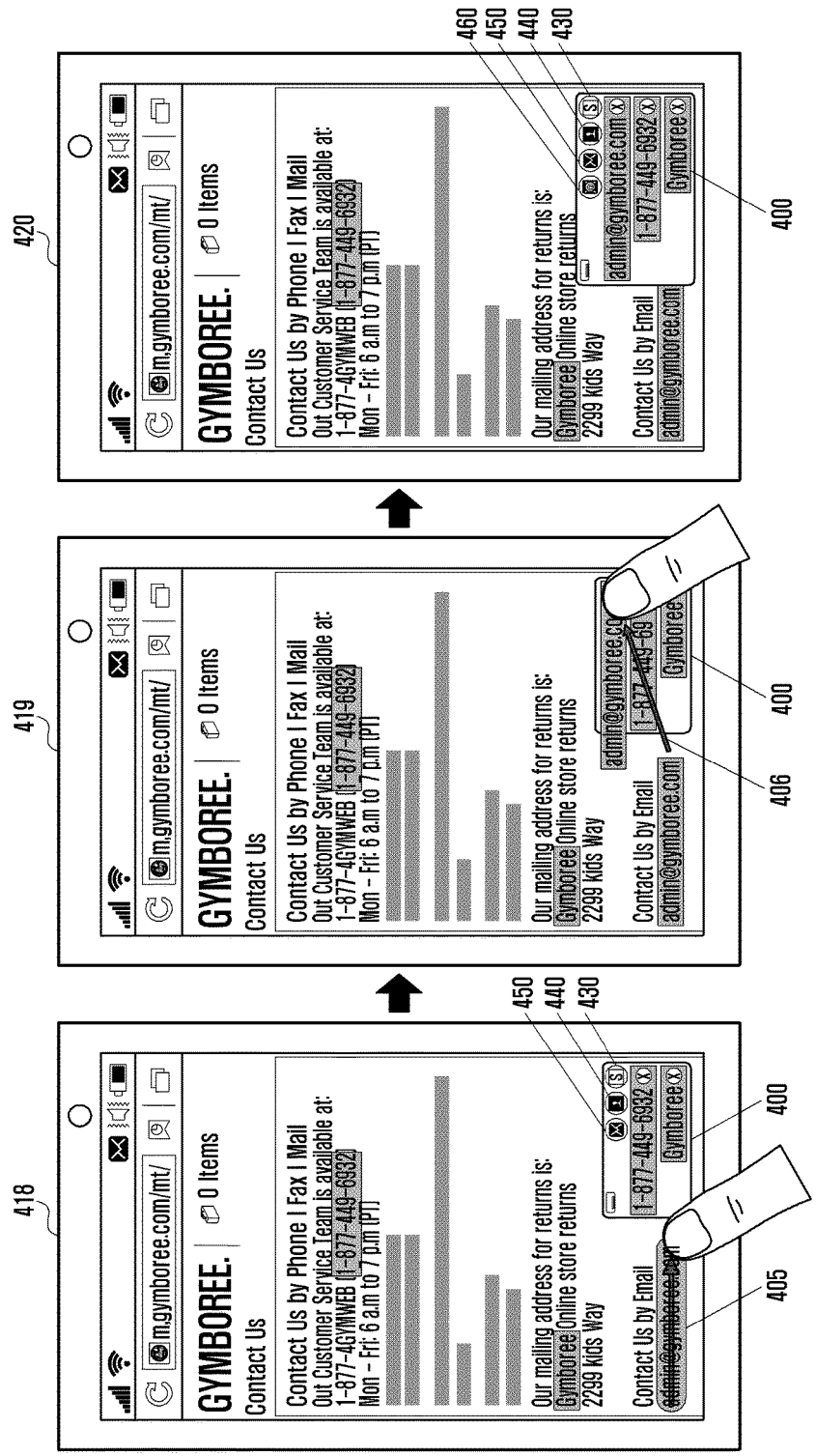

Next, through the above procedures, the controller 110 may detect that a text '1-887-449-6399' is dragged as illustrated in reference numeral 403 on a screen <415> of FIG. 4C. In addition, if it is detected that the selected text is moved to a tray 400 as illustrated in reference numeral 404 on a screen <416> of FIG. 4C, the controller 110 may display the selected text in the tray 400. In addition, the controller 110 may analyze the text displayed in the tray 400 to recommend an application related with the text. The application related with the text displayed in the tray 400 may be a memo application 430, a contact application 440, and a SMS application 450 in a screen <417> of FIG. 3C. In addition, through the above procedures, the controller 110 may detect that a text "admin@gymboree.com" is dragged as illustrated in reference numeral 405 of a screen <418> of FIG. 4D, and may detect that the selected text is moved to the tray 400 as illustrated in reference numeral 406 on a screen <419> of FIG. 4D. Next, the controller 110 may analyze the text displayed in the tray 400 to display recommendation application related with the text in the tray 400 as illustrated on a screen <420> of FIG. 4D. Accordingly, the controller 110 may display the icon of the memo application 430, the contact application 440, the SMS application 450, and the e-mail application 460. Referring back to FIG. 3, the controller 110 determines whether the memo information is included on the text displayed in the tray 400 at operation 311, and determines whether a phone number is included in the tray 400 at operation 313. In this manner, if it is determined that the text and the phone number are included in the tray 400, the controller 110 may display the icon of a contact application 440 and an SMS application 450 related with a contact on the tray 400 at operation 315. Accordingly, the controller 110 may display the icon of the memo application 430, the contact application 440, the SMS application 450, and the e-mail application 460 on the tray 400.

Figure 4E:
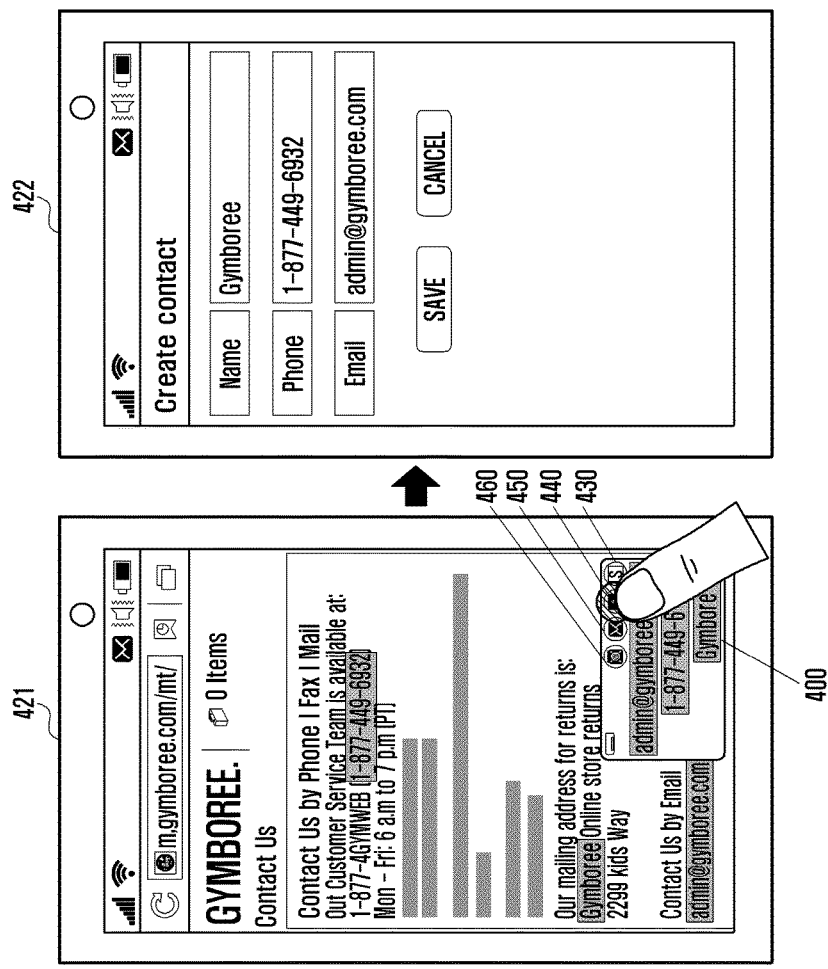

Here, if selection of the contact application 440 is detected as illustrated on a screen <421> of FIG. 4E at operation 317, the controller 110 may execute the contact application at operation 319. A screen <422> of FIG. 4E is an example of a screen of pasting the contents kept in the tray 400 into a corresponding field by executing the contact.

As a result of the analysis of the text displayed on the tray 400, if the text is not included in the tray 400 at operation 311, the controller 110 controls to perform a corresponding function at operation 323.

Meanwhile, phone number is not detected among the text displayed on the tray 400 at operation 313, the controller 110 may control to execute a memo application related with the memo information.

Figure 5:
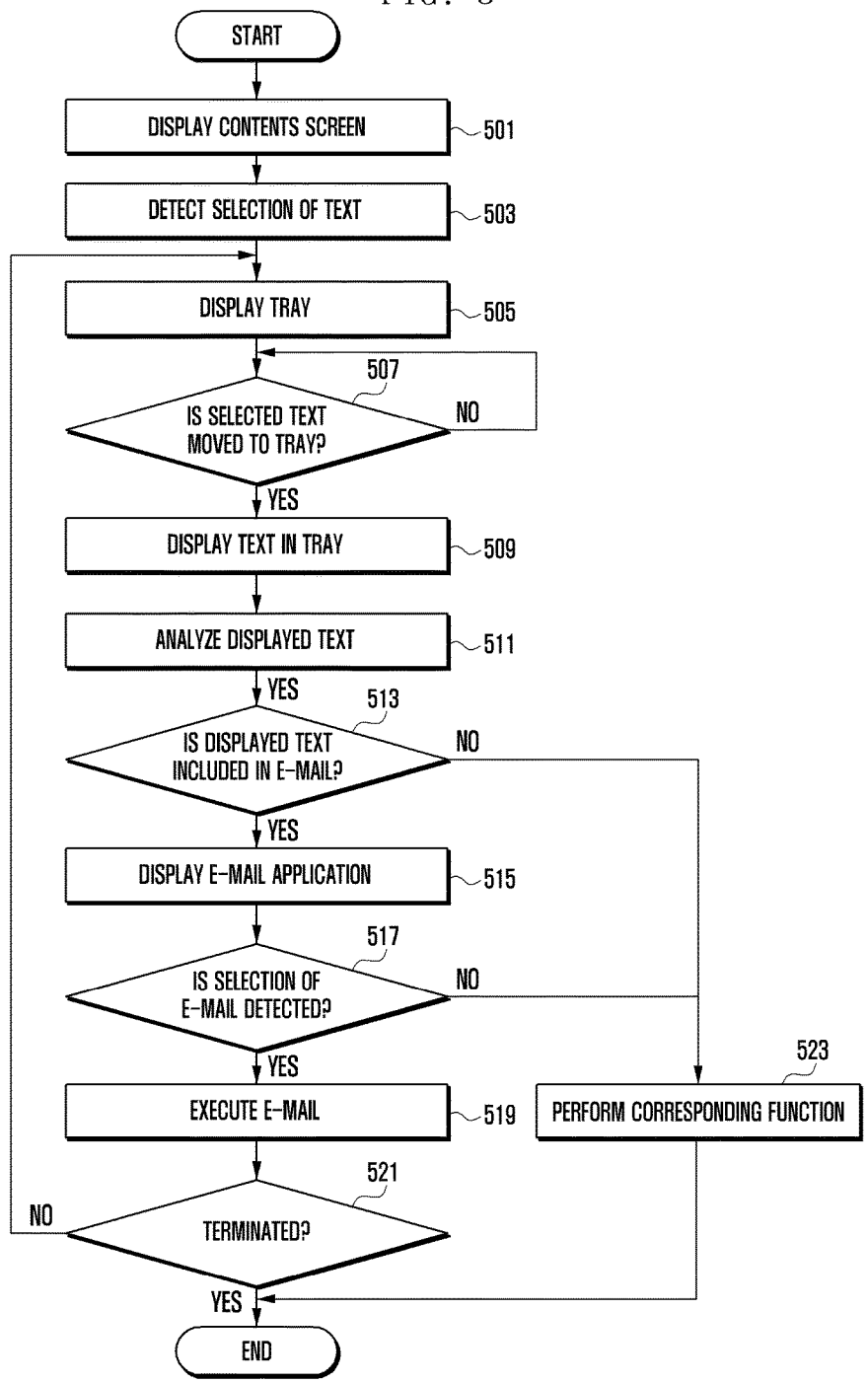
FIG. 5 illustrates a process of processing an e-mail application by selecting e-mail information from the contents screen shown in FIG. 2.
Figure 6A:
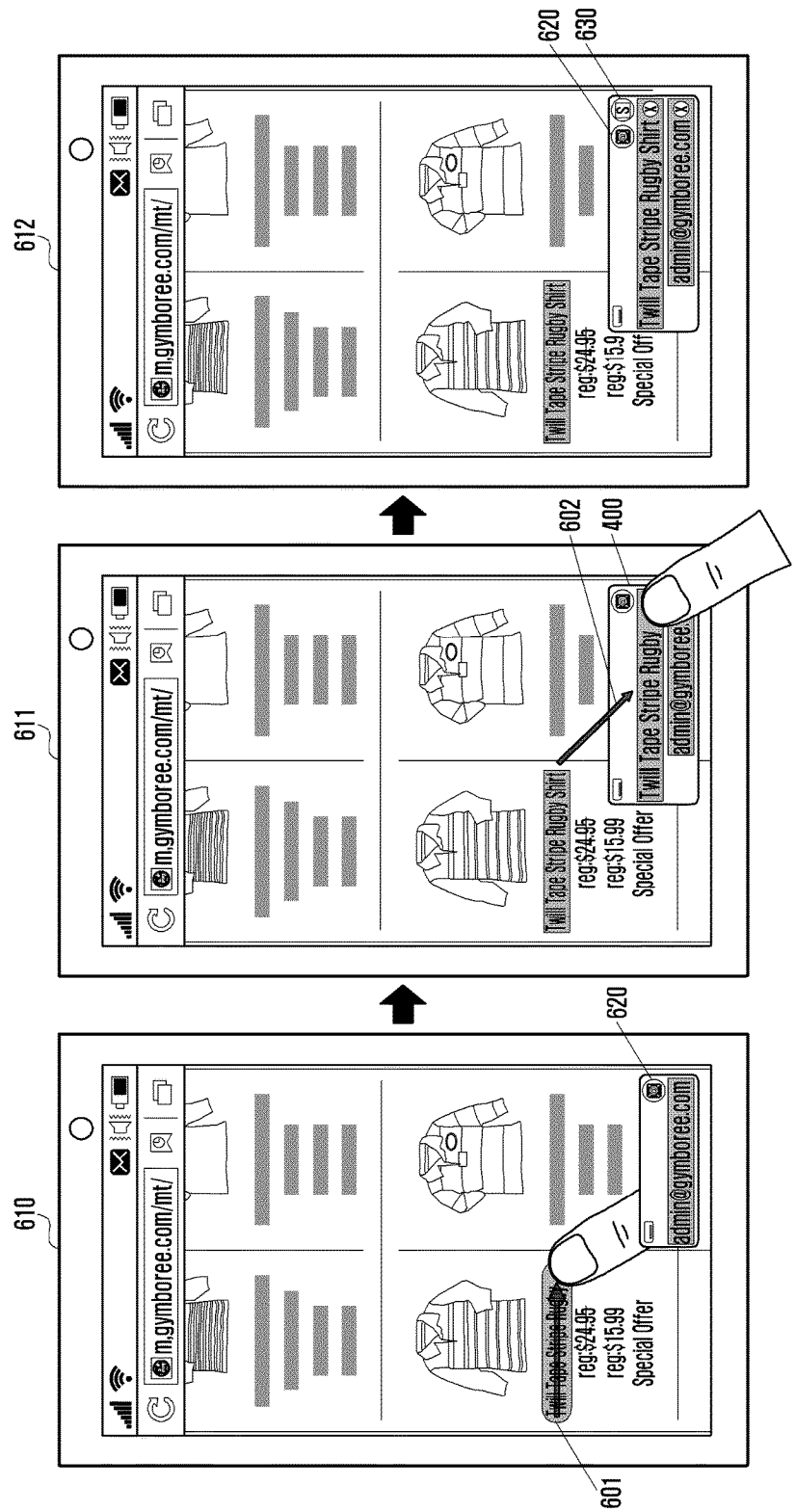
FIGS. 6A and 6B illustrate diagrams showing an operation procedure of an application executed in the procedure shown in FIG. 5.
Figure 6B:
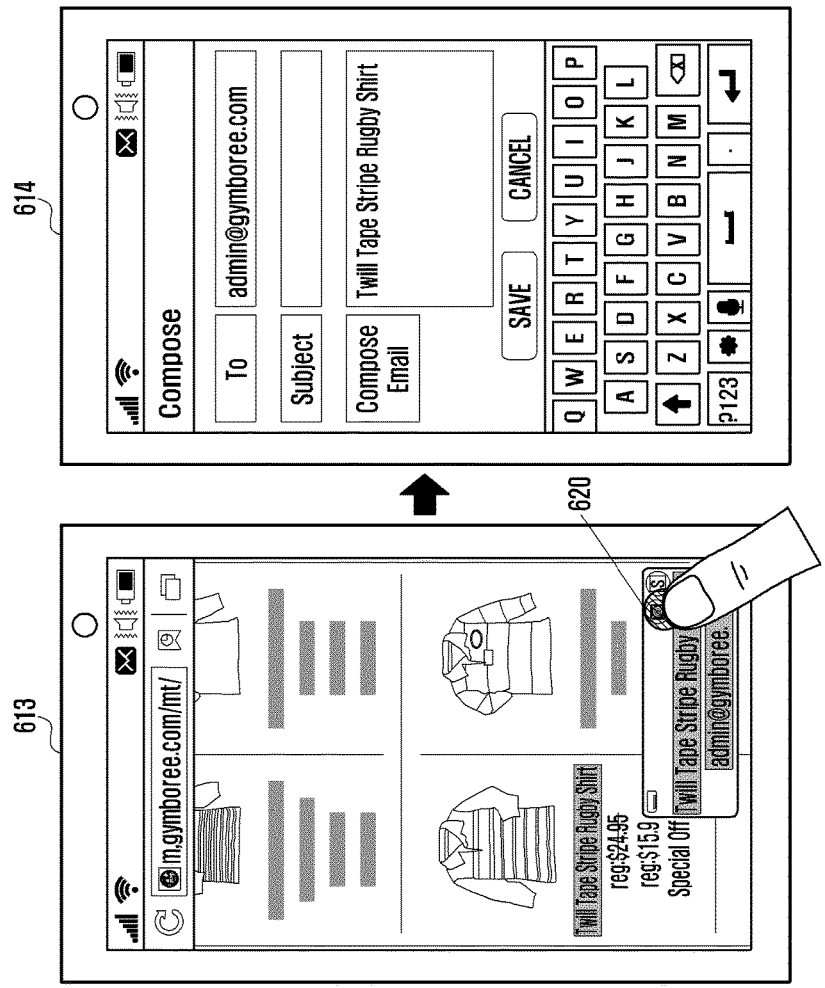

FIG. 5 illustrates a process of processing an e-mail application by selecting e-mail information from the contents screen shown in FIG. 2. FIGS. 6A and 6B illustrate diagrams showing an operation procedure of an application executed in the procedure shown in FIG. 5.

Referring to FIG. 5, FIGS. 6A and 6B, at operation 501, the controller 110 may display a contents screen like a screen <610> of FIG. 6A on the display panel 132. If selection of the text as illustrated in reference numeral 601 is detected at operation 503, the controller 110 may control to display the tray 400 at operation 505. A previously collected text (e.g. e-mail) "admin@gymboree.com" is displayed on the tray 400 in the same manner as at operations 301 to 309. Next, it is detected that the selected text 'Twill Tape Stripe Rugby Shirt' is moved to the tray 400 as illustrated in reference numeral 602 on a screen <611> of FIG. 6A at operation 507, the controller 110 may display the text in the tray 400 at operation 509. A screen <612> illustrates an example of a screen which display the text in the tray 400. Here, the controller 110 may analyze the kept text at operation 511, and determine whether the analyzed text is an e-mail at operation 513.

Next, at operation 515, the controller 110 may display an e-mail application 620 and a memo application 630, which are the related applications, in the tray 400. The tray 400 may be displayed to be overlaid with a partial region of the display panel 132. Next, if selection of the e-mail application 620 is detected from a screen <613> of FIG. 6B at operation 517, the controller 110 may control to execute the e-mail as illustrated on a screen <614> at operation 519. When the e-mail is executed, the controller 110 may control to provide contents displayed in the tray 400 to a corresponding field as illustrated on a screen <614>.

Figure 8B:
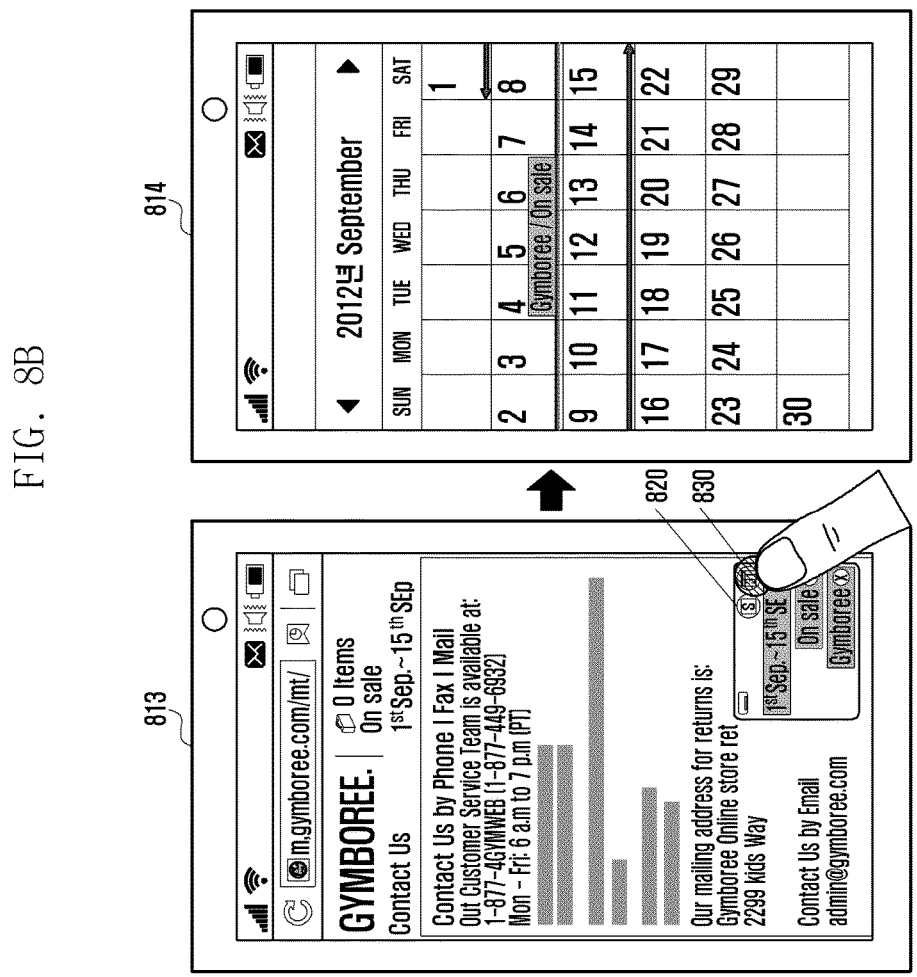

FIG. 7 illustrates a process of processing a scheduler application by selecting time information from a contents screen shown in FIG. 2. FIGS. 8A and 8B illustrate diagrams showing an operation procedure of an application executed in the procedure shown in FIG. 7.

Referring to FIG. 7, FIGS. 8A and 8B, at operation 701, the controller 110 may display the contents screen of an application as illustrated on a screen <810> of FIG. 8A on a display panel 132. It is assumed that the contents screen is an Internet application execution screen. On a screen <810> of FIG. 8A, the controller 110 may display the text 'Gymboree' on the tray 400 through the same procedures as operations 201 to 209 of FIG. 2. In this embodiment, the controller 110 may analyze the text displayed in the tray 400 to display a memo 820 which is an application related with the 'Gymboree (memo information)'. Next, if selection of the text ' on sale' is detected through a drag as illustrated in reference numeral 801 on a contents screen <810> of FIG. 8A at operation 703, the controller 110 may display the tray 400 at operation 705. In addition, if it is detected that the selected text is moved to the tray 400 as illustrated in reference numeral 802 on a screen <811> of FIG. 8A at operation 707, the controller 110 may control the display panel 132 to display selected texts 'Gymboree' and 'on sale' in the tray 400 as illustrated on a screen <812> of FIG. 8A at operation 709. Through the above procedures, on a screen <812> of FIG. 8A, the controller 110 may detect that '1st September~15st September' is dragged, and then is moved to the tray 400. After that, the controller 110 may display the selected contents on the tray 400 of the display panel 132. Accordingly, the texts 'Gymboree', 'on sale', and '1st September~15st September' are displayed on the tray 400.

Next, the controller 110 may analyze the displayed text at operation 711, and determine whether time information of a year, a month, and a day are detected from the displayed texts at operation 713. If the time information is not detected, the controller 110 may control to perform a corresponding function at operation 723. Meanwhile, if the time information is detected, the controller 110 may display scheduler application 830 related to displayed text. At this time, the controller 110 may display recommendation application related to displayed text 'Gymboree', 'on sale' and '1st September~15st September'. Here, the recommendation application may memo application 820 related to selected text (memo information) 'Gymboree' and 'on sale' and scheduler application 830 related to selected text (time information) '1st September~15st September'. If selection of the scheduler application 830 is detected as illustrated on a screen <813> at operation 717, the controller 110 may control to execute the scheduler application 830 as illustrated on a screen <814> at operation 719. When the scheduler application is executed, the controller 110 may execute the scheduler by using text information displayed in the tray 400. That is, the controller 110 may control on the display panel 132 to display a date corresponding to the '1st September~15st September', and simultaneously displays the 'Gymboree' and the 'on sale' collected in the tray 400.

Figure 10A:
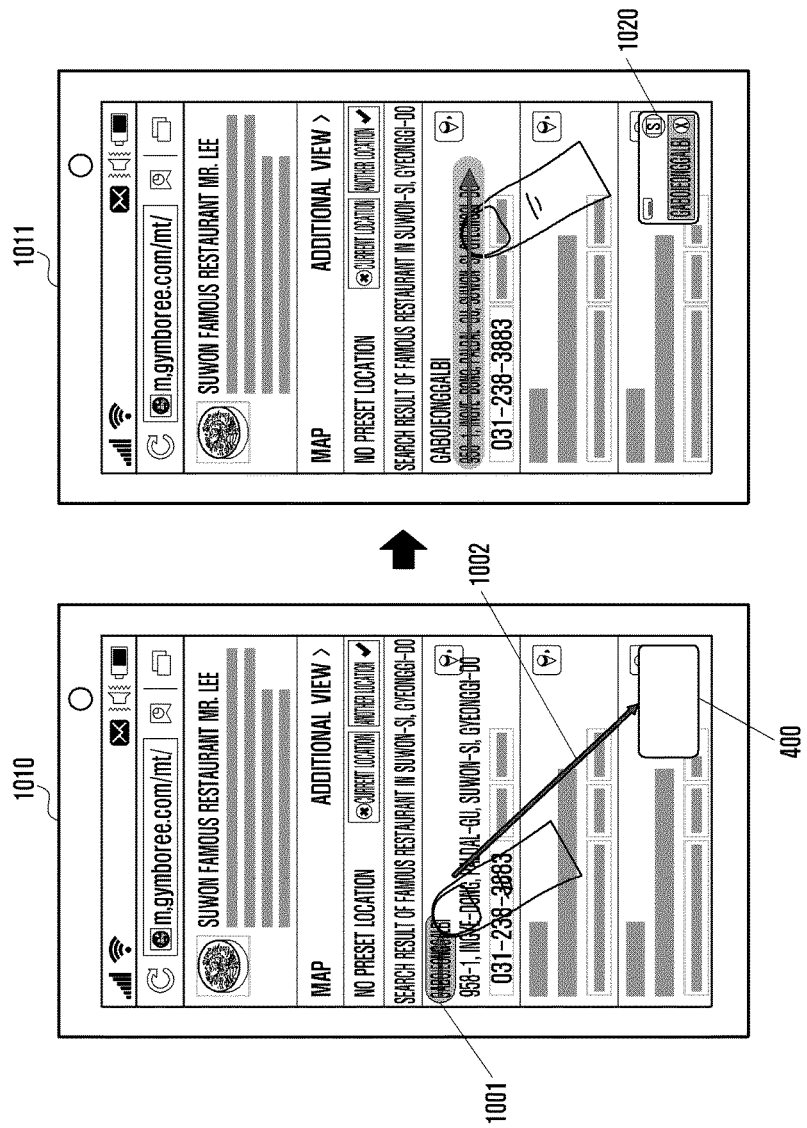
FIGS. 10A and 10B illustrate diagrams showing an operation procedure of an application executed in the procedure shown in FIG. 9.
Figure 10B:
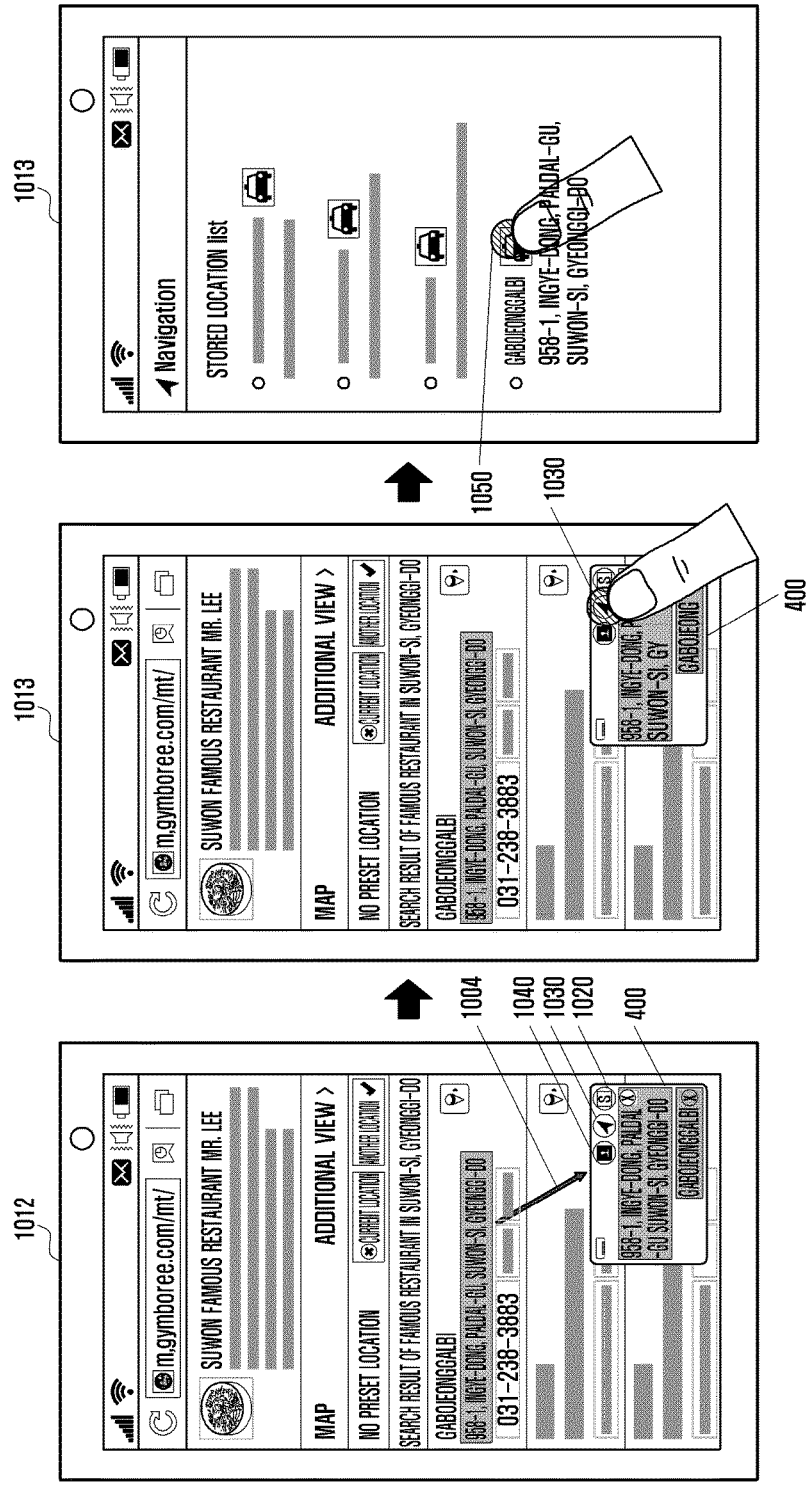

FIG. 9 illustrates a process of processing a navigation application by selecting location information from the contents screen shown in FIG. 2. FIGS. 10A and 10B illustrate diagrams showing an operation procedure of an application executed in the procedure shown in FIG. 9

Referring to FIG. 9, and FIGS. 10A and 10B, the controller 110 may display the contents screen as illustrated on a screen <1010> of FIG. 10A on the display panel 132 at operation 901. For example, the contents screen may be an Internet application execution screen as illustrated on a screen <1010> of FIG. 10A, and include characters, numbers, and images.

If a drag 1001 to select a text 'Gabojeonggalbi' is detected at operation 903, the controller 110 may control the display panel 132 to display the tray 400 capable of displaying the selected text at operation 905. Next, at operation 907, the controller 110 may detect whether a drag as illustrated in reference numeral 1002 on a screen <1010> of FIG. 10A to move the text to the tray 400 occurs.

Further, the controller 110 may display the text 'Gabojeonggalbi' in the tray 400 as illustrated on a screen <1011> of FIG. 10A at operation 909. Next, at operation 911, the controller 110 may analyze the texts displayed in the tray 400. In addition, the controller 110 may display recommendation application related with the text 'Gabojeonggalbi' on the tray 400 which is displayed to be overlaid with the display panel 132 as illustrated on a screen <1011> of FIG. 10A. That is, the controller 110 may display a memo application 1020 related with the location information 'Gabojeonggalbi' as an icon.

Next, the controller 110 detects selection of a text (location information) '958-1, Ingye-dong, Paldal-gu, Suwon-si, Gyeonggi-do' through a drag as illustrated in reference numeral 1004 on a screen <1012> of FIG. 10B. After that, the controller 110 may detect that the selected text '958-1, Ingye-dong, Paldal-gu, Suwon-si, Gyeonggi-do' is moved to the tray 400 through a drag as illustrated in reference numeral 1004 on a screen <1012> of FIG. 10B. In this embodiment, at operation 911, the controller 110 may analyze texts displayed in the tray 400 which is displayed to be overlaid with a partial region of the contents screen. As a result of the analysis, if location information is not included in the displayed texts at operation 913, the controller 110 may control to perform a corresponding function at operation 923. Here, the location information may an address. If the location information (e.g an address) is included in the displayed texts, the controller 110 may display an application related with the address on the tray 400 overlaid with the contents screen as illustrated on a screen <1012> of FIG. 10B. That is, when the text displayed on the tray 400 is analyzed, the controller 110 may determine the '958-1, Ingye-dong, Paldal-gu, Suwon-si, Gyeonggi-do, 442-826' as the address. Accordingly, at operation 915, the controller 110 may display a navigation application 1030 related with the address on the tray 400 as illustrated on a screen <1012> of FIG. 10B. Further, the controller 110 may determine the text '958-1' as a phone number. In this embodiment, the controller 110 may display a contact application 1040 on the tray 400 as illustrated on a screen <1012> of FIG. 10B.

In a state in which the application related with the displayed text is displayed on the tray 400, if selection of the navigation application 1030 is detected from a screen <1030> of FIG. 103 at operation 917, the controller 110 may display a navigation execution screen as illustrated on a screen <1014> of FIG. 103 at operation 919.

When the navigation is executed, if selection of reference numeral 1050 by the user is detected from the screen <1014>, the controller 110 may control to execute a guide immediately.

Hereinafter, except for the applications displayed on the tray as described above, a procedure of selecting and executing an application by the user will be described.

Figure 12:
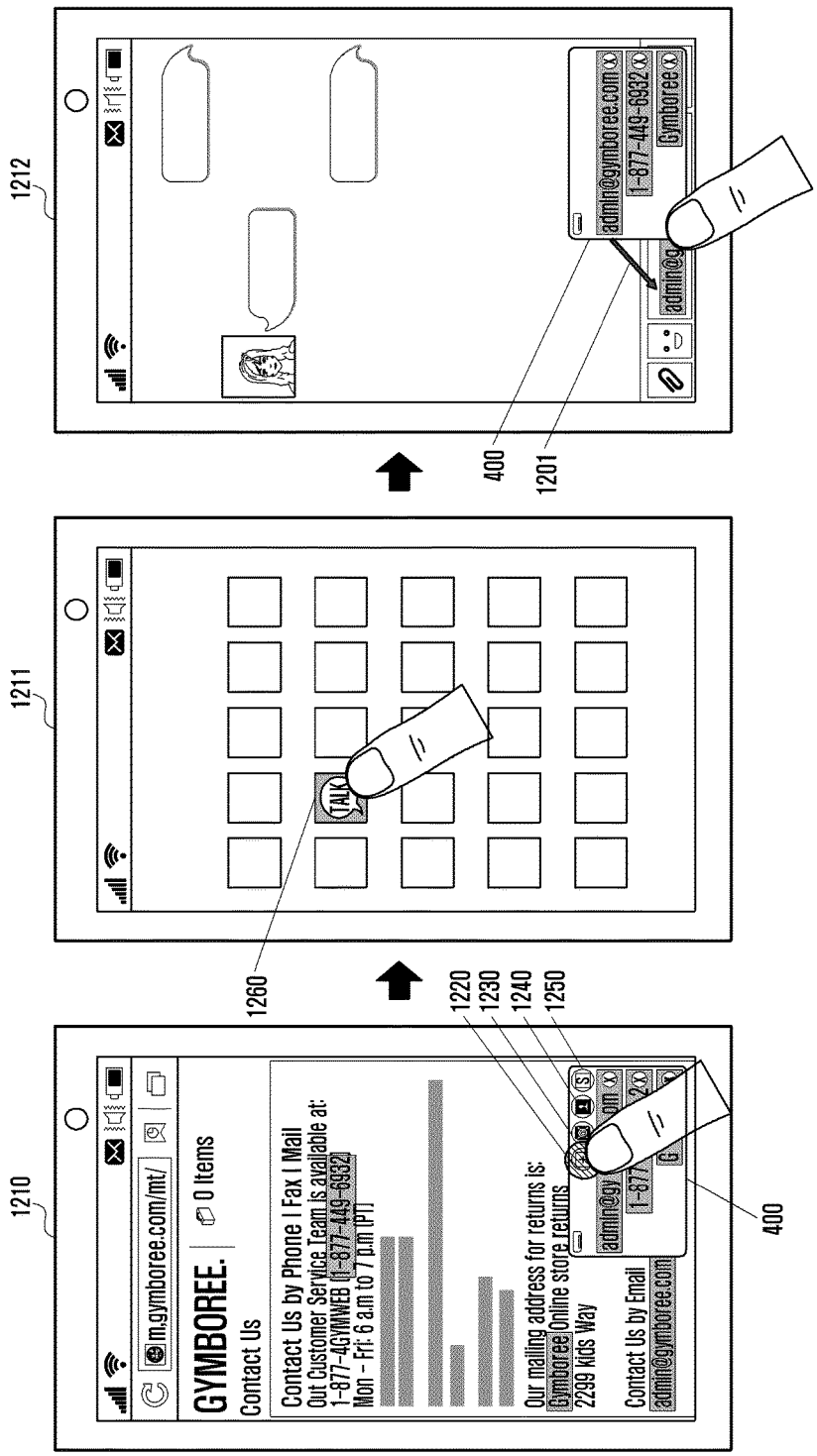
FIG. 12 illustrates a diagram showing a procedure of selecting an application executed by the method shown in FIG. 11.

FIG. 11 illustrates a process of selecting application except for an application displayed on a tray of the contents screen shown in FIG. 2 according to an embodiment of the present disclosure. FIG. 12 illustrates a diagram showing a procedure of selecting an application executed by the method shown in FIG. 11.

Referring to FIGS. 11 and 12, the display panel 132 displays a contents screen in which an application is executed under control of the controller 110 as illustrated on a screen <1210> of FIG. 12 at operation 1101. For example, the application is an Internet application, and.

The screen <1210> of FIG. 12 is a screen displayed through operations 1101 to 1113. Since operations 1101 to 1113 are the same as operations 201 to 213, a detailed description thereof is omitted.

Through the above procedures, the controller 110 may display the tray 400 on the screen <1210> of FIG. 12. Texts 'Gymboree', '1-877-449-6932', and 'admin@gymboree.com' are displayed in the tray 400 by selection of the user. Further, the controller 110 may analyze the displayed text to display an application related with the text on the tray 400. Accordingly, the controller 110 may display a memo application 1250 related with the text (memo information) 'Gymboree', a contact application 1240 related with the text (phone number) '1-877-449-6932', and an e-mail application 1230 related with the text (e-mail) 'admin@gymboree.com' on the tray 400.

In a state in which the text displayed in the tray 400 and the recommendation, the controller 110 provides an option icon 1220 such that a user may select an application except for recommendation applications from a screen <1210> of FIG. 12 at operation 1115. That is, the controller 110 may display the option icon 1220 such that the user may select another application in the portable terminal 100. If a user input of selecting the option icon 1220 is detected, the controller 110 may control to display a menu screen of the portable terminal 100 like a screen <1211> of FIG. 12 at operation 1117. The controller 110 may detect selection of the icon corresponding to an application from the menu screen like a screen <1211> of FIG. 12 at operation 1119. For example, if selection of a chatting application 1260 is detected, the controller 110 may execute an application corresponding to the selection as illustrated on a screen <1212> of FIG. 12 at operation 1121. If the contents displayed in the tray 400 are dragged to a chatting input window as illustrated in reference numeral 1201 when the selected application is executed, the controller 110 may control to paste the contents collected in the tray 400 into the chatting input window at once.

Figure 13:
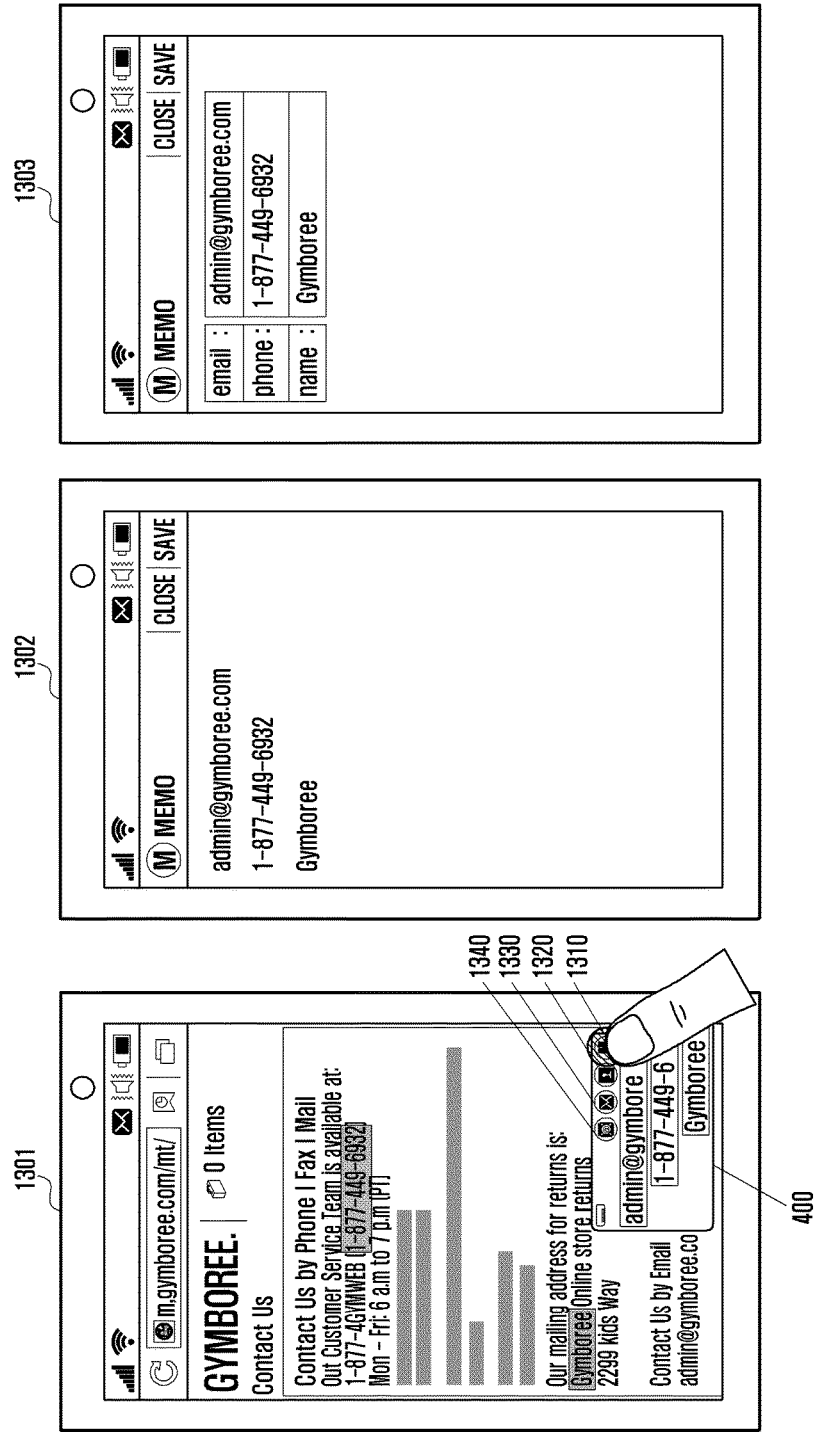
FIG. 13 illustrates a diagram showing an example of selecting a memo application by selecting memo information on a contents screen according to an embodiment of the present disclosure.

FIG. 13 illustrates a diagram showing an example of selecting a memo application by selecting memo information from a contents screen according to an embodiment of the present disclosure.

Referring to FIGS. 2 and 13, a screen <1301> illustrates an example of a screen on which operations 201 to 213 of FIG. 2 are performed. The controller 110 may display texts 'admin@gymboree.com', '1-887-449-6399', and 'Gymboree' which are selected through the above operations on the tray 400 of a screen <1301>. Further, the controller 110 may display an application related with the selected text on the tray 400. The application related with the selected text may be a memo application 1310 a, a contact application 1320, an SMS application 1330, and an e-mail application 1340. In this state, if selection of the memo application 1310 is detected, the controller 110 may execute the memo application.

If the memo application is executed, the controller 110 may paste the displayed text into the tray 400 at once as illustrated like a screen <1302>. In this embodiment, when the paste is performed, the controller 110 may map a relevant field to the displayed text to display the mapping result like a screen <1303>.

That is, the controller 110 may map the relevant field 'e-mail' to an 'admin@gymboree.com', may map the relevant field 'phone' to '1-887-449-6399', and may map the relevant field 'name' to a 'Gymboree' to display the mapping results.

If certain information is selected from a displayed contents screen, the portable terminal with the touch device may display the tray at a partial region of the contents screen, and may keep and display the selected information and an application item related with the selected information in the tray. Further, if the displayed item is selected, the portable terminal may execute an application of the selected item and may display the information displayed in the tray in the executed application to efficiently perform the application. That is, when a plurality of words in a text of the contents could be simultaneously used in another application, the portable terminal may collectively process words in another task (application) at once without performing a plurality of copy/paste steps and a step of filling corresponding fields of an application screen in which a corresponding word is used with reference to a temporary storage area.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for processing contents in a portable terminal including a controller, the method comprising:
   detecting, by the controller, a selection of information from the contents displayed on a contents screen;
   responsive to detecting the selection of the information from the contents on the contents screen, displaying, by the controller, a tray in the contents screen to display the information;
   detecting, by the controller, a user input to move the information to the tray;
   displaying, by the controller, the information and at least one item respectively corresponding to at least one recommendation application related to the information on the tray after the information is moved to the tray; and
   responsive to detecting a selection of one of the at least one item displayed on the tray, executing, by the controller, an application corresponding to the selected item,
   wherein the executing of the application corresponding to the selected item comprises processing at least one text displayed in the tray by the application corresponding to the selected item.

2. The method of claim 1,
   wherein the information is a text.

3. The method of claim 1, wherein the displaying of the information and the at least one item corresponding to each of the at least one recommendation application comprises:
   selecting at least one text from the contents screen;
   displaying the text on the tray when the selected text is moved to the tray; and
   displaying the at least one item corresponding to at least one processable recommendation application on the tray.

4. The method of claim 3, wherein the tray is displayed to be overlaid with a partial region of the contents screen, and
   wherein the displaying of the information and the at least one item corresponding to each of the at least one recommendation application comprises:
      displaying the selected text and the at least one item corresponding to each of the at least one recommendation application on the tray when the text is selected from the displayed contents screen; and
      displaying the selected text and the at least one item corresponding to each of the at least one recommendation application on the tray together with a previous text and at least one previous item corresponding to each of at least one previous recommendation application when another text is selected from the contents screen.

5. The method of claim 3, wherein the displaying of the information and the at least one item corresponding to each of the at least one recommendation application comprises displaying a phone number and an item corresponding to a contact application on the tray when the selected text is the phone number, and
   wherein the processing of the text comprises:
      executing the contact application when the item corresponding to the contact application is selected; and
      mapping at least one text displayed on the tray to a corresponding field on a contact screen.

6. The method of claim 1, wherein the displaying of the information and the at least one item corresponding to each of the at least one recommendation application comprises displaying an e-mail and an item corresponding to an e-mail application on the tray when the selected item is an email, and
   wherein the processing of the text comprises:
      executing the e-mail application when the item corresponding to the e-mail application is selected; and
      mapping at least one text displayed on the tray to a corresponding field on an e-mail screen.

7. The method of claim 3, wherein the displaying of the information and the at least one item corresponding to each of the at least one recommendation application comprises displaying an item corresponding to a scheduler application on the tray when the selected text is time information of a year, a month, and a day, and
   wherein the processing of the text comprises:
      executing the scheduler application when the item corresponding to the scheduler application is selected; and
      mapping at least one text displayed on the tray to a corresponding field on a scheduler screen.

8. The method of claim 3, wherein the displaying of the information and the at least one item corresponding to each of the at least one recommendation application comprises displaying location information and an item corresponding to a navigation application on the tray when the selected text is the location information, and
   wherein the processing of the text comprises:
      executing the navigation application when the item corresponding to the navigation application is selected; and
      mapping at least one text displayed on the tray to a map screen.

9. The method of claim 3, wherein the displaying of the information and the at least one item corresponding to each of the at least one recommendation application comprises displaying an item corresponding to a memo application on the tray when the selected text is memo information, and
    wherein the processing of the text comprises:
        executing the memo application when the item corresponding to the memo application is selected; and
        mapping at least one text displayed on the tray to a relevant field by suggesting the relevant field related with the text displayed on the tray.

10. The method of claim 1, wherein the displaying of the information and the at least one item corresponding to each of the at least one recommendation application comprises displaying a menu item on the tray, and
    wherein the processing of the text comprises:
        displaying an application menu associated with applications when the menu item is selected;
        executing an application selected from the application menu; and
        mapping at least one text displayed on the tray to an executed application screen.

11. An apparatus for processing contents in a portable terminal, the apparatus comprising:
    a display; and
    a controller configured to:
        detect a selection of information from the contents displayed on a contents screen,
        display a tray in the contents screen to display the information in response to detecting the selection of the information,
        analyze the selected information,
        detect a user input to move the information to the tray,
        display the information and at least one item respectively corresponding to at least one recommendation application related to the information on the tray after the information is moved to the tray,
        when a selection of one of the at least one item displayed on the tray is detected, execute an application corresponding to the selected item,
        detect selecting at least one text from the contents screen,
        display the selected text in the tray when the selected text is moved to the tray, and
        display the at least one item respectively corresponding to the at least one recommendation application associated with the selected text on the tray.

12. The apparatus of claim 11,
    wherein the information is a text.

13. The apparatus of claim 11, wherein the controller is configured to control the display to display the tray to be overlaid with a partial region of the contents screen.

14. The apparatus of claim 13, wherein the controller is configured to control the display to:
    display the selected text and the at least one item corresponding to each of the at least one recommendation application in the tray when the text is selected from the contents screen, and
    display the selected text and the at least one item corresponding to each of the at least one recommendation application on the tray together with a previous text and at least one previous item corresponding to each of at least one previous recommendation application when selection of another text is detected from the contents screen.

15. The apparatus of claim 14, wherein the controller is configured to:
    when the selected text is a phone number, control the display to display the phone number and an item corresponding to a contact application on the tray,
    execute the contact application when selection of the item corresponding to the contact application is detected, and
    map at least one text displayed in the tray to a corresponding field of a contact screen.

16. The apparatus of claim 15, wherein the controller is configured to:
    when the selected text is an e-mail, control the display to display the e-mail and an item corresponding to an e-mail application on the tray,
    execute an e-mail application when selection of the item corresponding to the e-mail application is detected, and
    map at least one text displayed in the tray to a corresponding field of an e-mail screen.

17. The apparatus of claim 16, wherein the controller is configured to:
    when the selected text is time information of a year, a month, and a day, control the display to display an item corresponding to a scheduler application on the tray,
    execute the scheduler application when selection of the item corresponding to the scheduler application is detected, and
    map at least one text displayed on the tray to a corresponding field of a scheduler screen.

18. The apparatus of claim 17, wherein the controller is configured to:
    when the selected text is location information, control the display to display an item corresponding to a navigation application on the tray,
    execute the navigation application when selection of the item corresponding to the navigation application is detected, and
    map at least one text displayed on the tray to a map screen.

19. The apparatus of claim 18, wherein the controller is configured to:
    when the selected text is memo information, control the display to display an item corresponding to a memo application on the tray,
    execute the memo application when selection of the item corresponding to the memo application is detected, and
    map at least one text displayed on the tray to a relevant field by suggesting the relevant field related with the text displayed on the tray.

20. The apparatus of claim 19, wherein the controller is configured to:
    control the display to display a menu item on the tray when displaying the at least one item corresponding to each of the at least one recommendation application,
    display an application menu associated with applications when selection of the menu item is detected,
    execute a selected application when the application is selected from the application menu, and
    map at least one text displayed on the tray to an executed application screen.

* * * * *